US005598689A

United States Patent [19]
Bork

[11] Patent Number: 5,598,689
[45] Date of Patent: Feb. 4, 1997

[54] TRIM MOWER ATTACHMENT FOR RIDING MOWERS

[76] Inventor: Bradley G. Bork, Box 368, Mediapolis, Iowa 52637

[21] Appl. No.: 455,341

[22] Filed: May 31, 1995

[51] Int. Cl.⁶ .................................................. A01D 34/66
[52] U.S. Cl. ........................... 56/13.7; 56/16.9; 56/DIG. 9
[58] Field of Search ................................. 56/13.6, 13.7, 56/16.9, 11.6, DIG. 9, 12.1, 12.7

[56] References Cited

U.S. PATENT DOCUMENTS

| | | | |
|---|---|---|---|
| 3,668,845 | 6/1972 | Parker | 56/16.9 X |
| 4,896,488 | 1/1990 | Duncan et al. | 56/13.7 |
| 5,167,108 | 12/1992 | Bird | 56/13.7 |

FOREIGN PATENT DOCUMENTS 0105785  11/1966  Denmark .................................. 56/13.7

Primary Examiner—Terry Lee Melius
Attorney, Agent, or Firm—James C. Nemmers

[57] ABSTRACT

An attachment or auxiliary mowing unit for riding mowers of all types having a centrally mounted mower deck. The auxiliary unit consists of a separate mower deck that is pivotly attached to the main mower deck near a front corner of the main deck, preferably the left front corner. The auxiliary deck is attached on pivots with horizontal axes that allow the auxiliary deck to pivot freely upwardly and downwardly about that axis. The auxiliary deck is powered directly from the main deck or by a separate hydraulic motor.

9 Claims, 9 Drawing Sheets

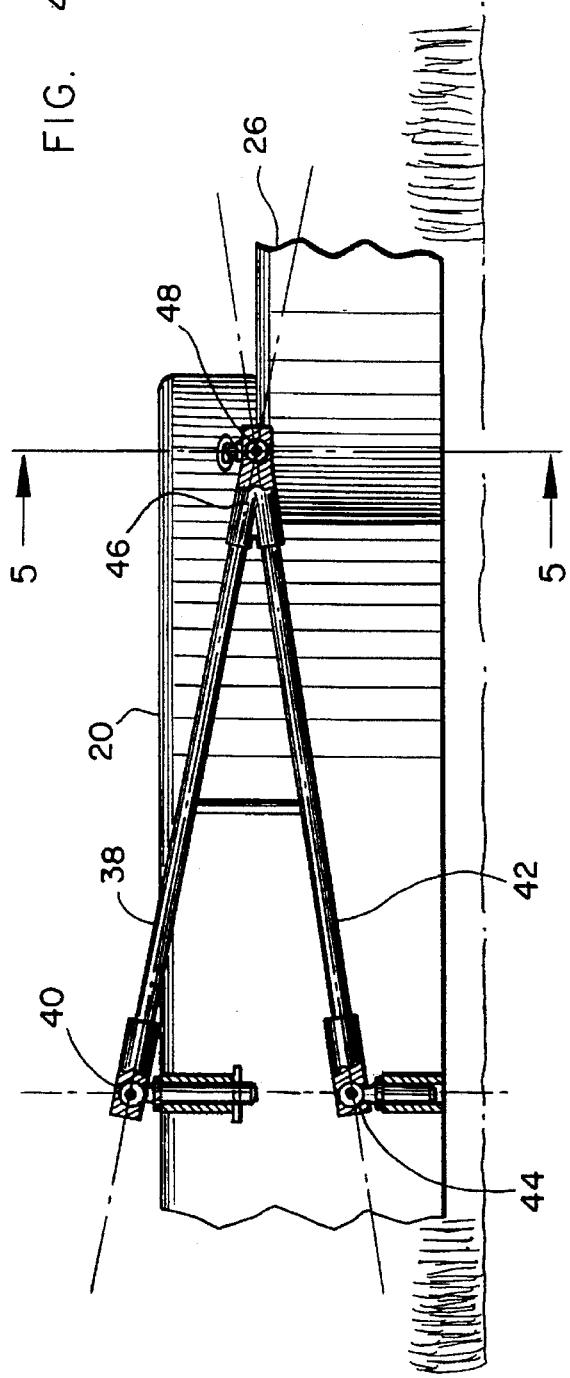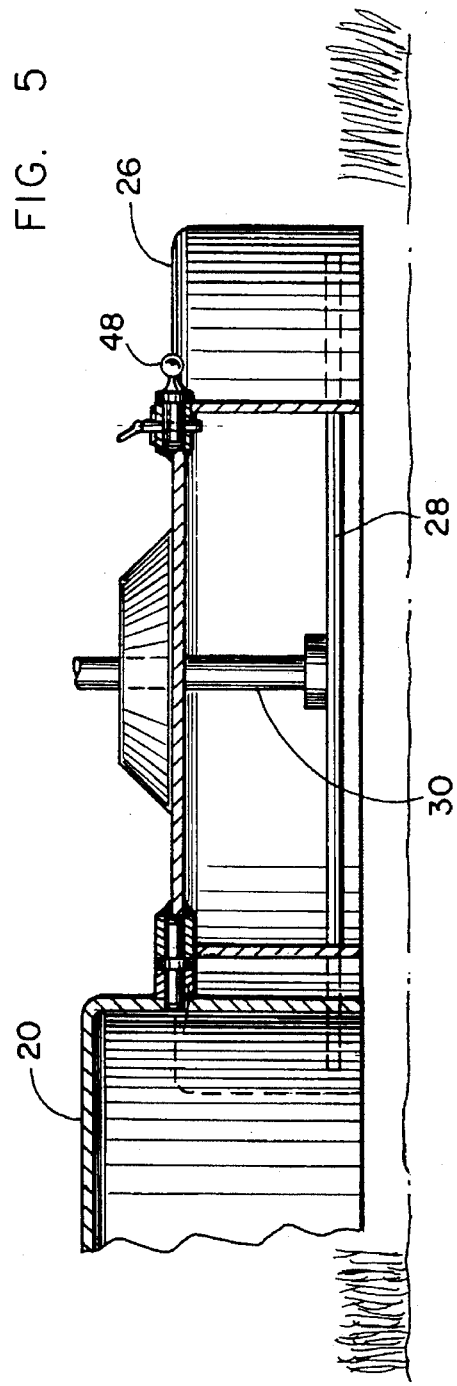

TRIM MOWER ATTACHMENT FOR RIDING MOWERS

BACKGROUND OF THE INVENTION

In recent years, the use of riding mowers has gained in popularity, not only for commercial applications but also for use by the homeowner in mowing his or her lawn. Riding mowers are obviously a major advantage in that a larger area can be mowed in less time and with less effort. One of the disadvantages, however, of riding mowers is that there may be a considerable amount of manual or hand trimming that must be done, especially if there are a number of obstructions, such as trees, fence posts, buildings, etc. that must be mowed around.

Another difficulty with most riding mowers is that they utilize what are termed "belly-mounted" mowers located beneath the tractor unit that propels the mowers. For example, there may be two, three or more decks, each containing a cutting blade mounted beneath the tractor unit. Since not all land that is to be mowed is flat, scalping of the lawn can occur. Also, when mowing land that include ditches, especially narrow bottom ditches, the typical riding mower has difficulty mowing the sides of the ditches.

In addition, because of the relatively wide width of even the small riding mowers, narrow areas between trees and other structures or obstructions may be too narrow to drive the tractor unit through, and therefore these areas have to be mowed by hand. A typical such situation would be in mowing heavily wooded areas or cemeteries where the obstructions are close together.

The existing riding mowers also have difficulty in mowing both outside corners and inside corners around buildings, fences, edging, along gardens, etc. This is because of the basic design in which the decks containing the cutting blades are centrally mounted on the tractor unit. Even with those units in which the decks containing the cutting blades are mounted on the front, inside and outside corners are difficult, and the front mounted mowers are not satisfactory for mowing the sides of even wide bottom ditches.

Some of the existing riding mowers have the capability of bagging the grass, but no known mowers which have a cutting width over 60 inches have bagging capability. This is because the cutting blades cannot move the grass into the bagger. It therefore would be a definite advantage if a riding mower had the capability of bagging grass even where the cutting width is wider than 60 inches.

There is therefore a need for an improved riding mower that has the capability of mowing close to obstructions of all types and over irregular land, including ditches. Any such improvement which allows close trimming in virtually all situations should also be relatively inexpensive, adaptable to existing designs of riding mowers as well as easily incorporated in the original manufacture of such equipment. Any such improvement should also be self-actuating in that it would require no additional controls and in fact would make the mowing quicker and easier to operate in all situations.

SUMMARY OF THE INVENTION

The invention is for an attachment or auxiliary mowing unit for riding mowers of all types. The auxiliary unit consists of a separate mower deck that is pivotly attached to the main mower deck near a front corner of the main deck, preferably the left front corner. The auxiliary deck is attached on a pivot with a horizontal axis that allows the auxiliary deck to pivot freely upwardly and downwardly about that axis. The auxiliary deck is mounted so that the cutting blade in it will cut a path that overlaps the path cut by the blade in the main deck nearest to the auxiliary deck. The horizontal pivotal axis for the mounting of the auxiliary deck to the main deck is along a line that lies in a vertical plane passing through approximately the center of the overlap of the cutting paths. The auxiliary deck is also securely mounted for such pivotal movement so that it is laterally stable. The cutting blade of the auxiliary deck is driven in any suitable manner such as by a belt and pulley arrangement connected to the drive for the blade in the main deck nearest to the auxiliary deck. In the alternative, if the tractor unit to which the auxiliary deck is attached as a hydraulic system, the auxiliary deck can be driven by a hydraulic motor. Also, the connections of the auxiliary deck to the main deck of the mower unit are preferably of the quick release type so that the auxiliary deck can be quickly and easily attached and removed from the mower unit.

BRIEF DESCRIPTION OF THE DRAWING

FIG. 4 is a sectional view taken on the line 4—4 of FIG. 1 and showing the pivotal mounting linkage;

FIG. 5 is a sectional view taken on line 5—5 of FIG. 4;

DESCRIPTION OF THE PREFERRED EMBODIMENT OF THE INVENTION

Figure 1:
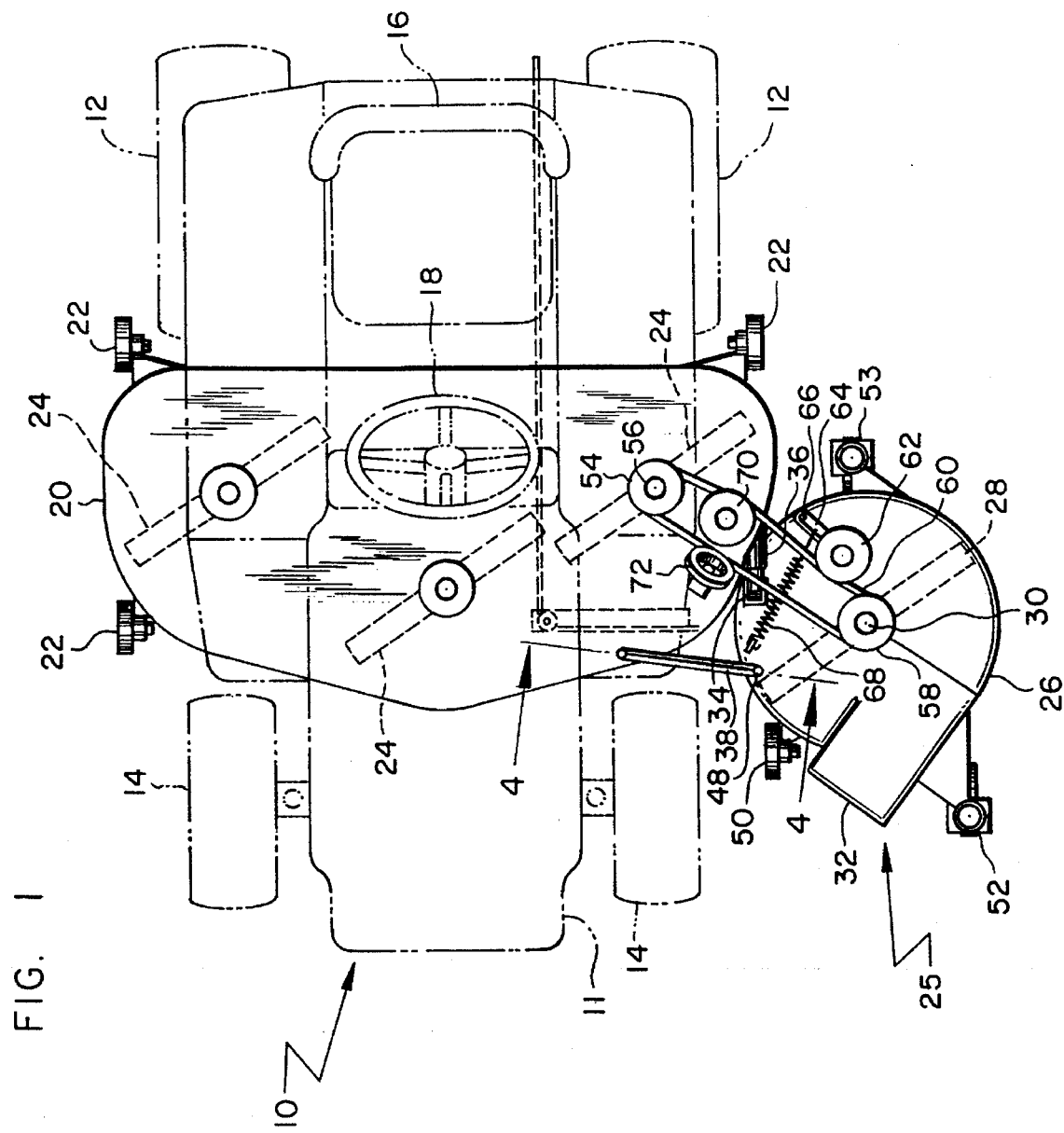
FIG. 1 is a top or plan view showing the auxiliary mower unit attached to the cutting deck of a tractor style mower, the tractor shown being of the type having a centrally mounted cutting deck.
Figure 2:
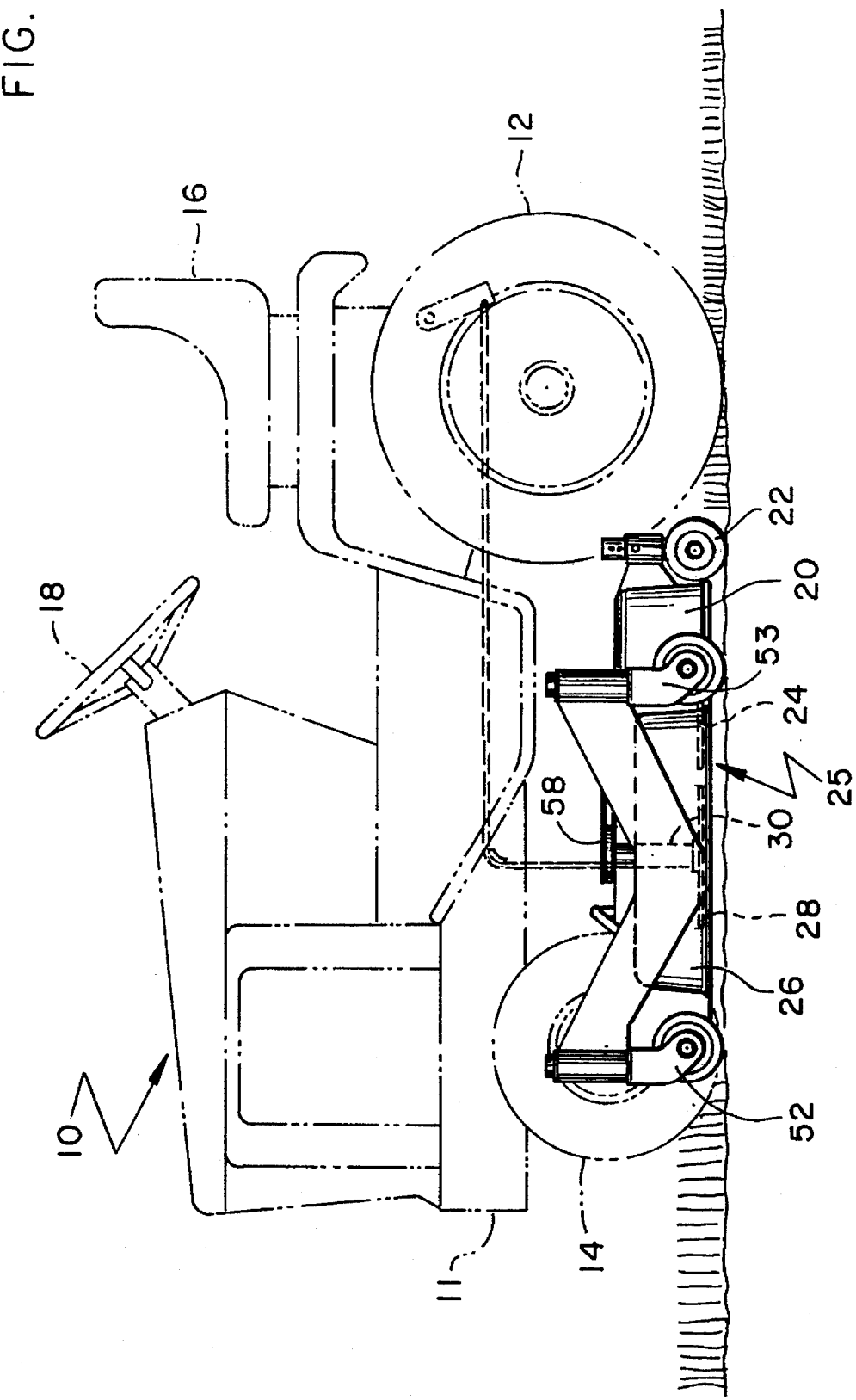
FIG. 2 is a side elevational view of the unit of FIG. 1.
Figure 3:
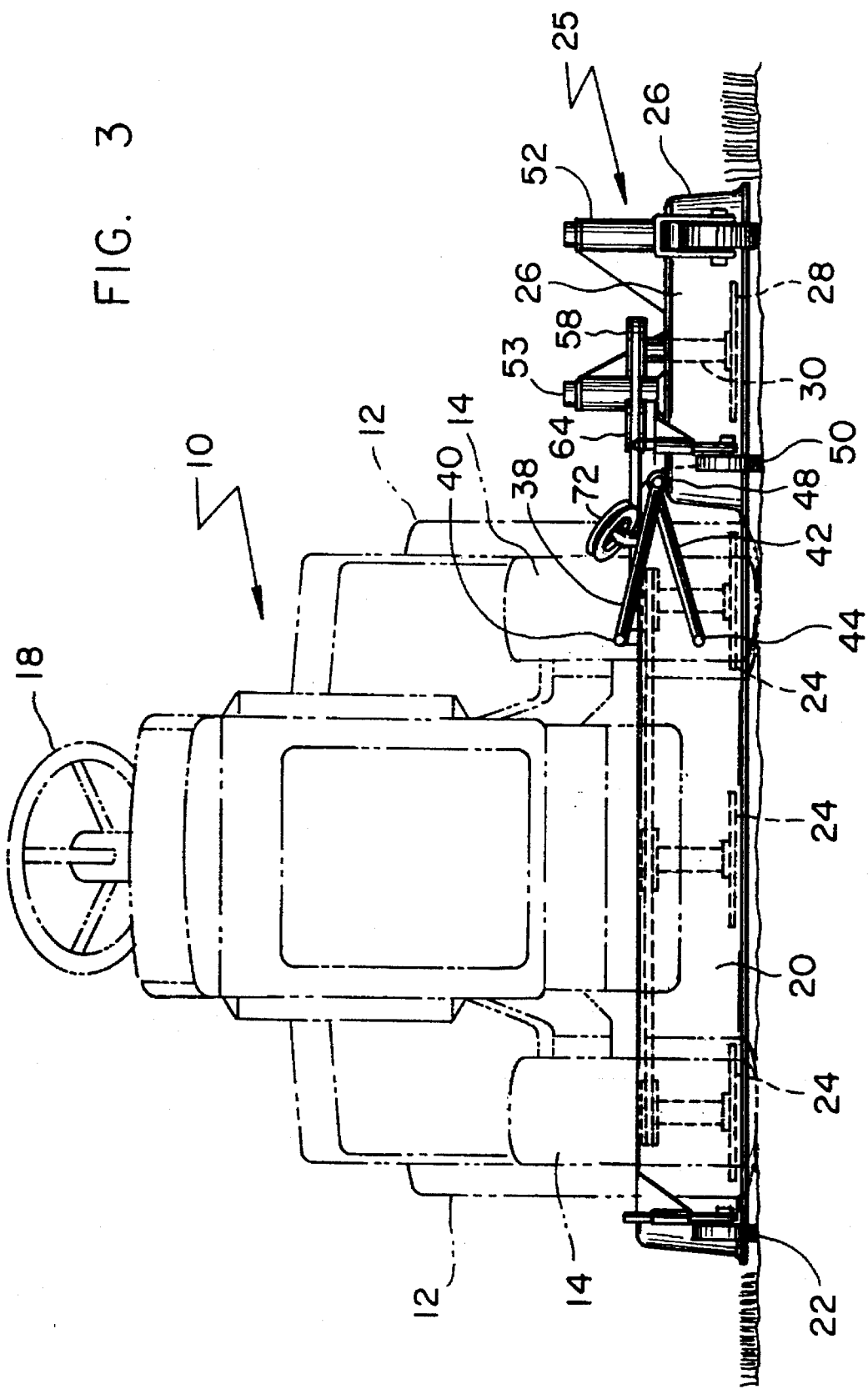
FIG. 3 is a front elevational view of the unit of FIGS. 1 and 2.

Referring first to FIGS. 1, 2 and 3, there is illustrated a typical tractor style riding mower 10 having a chassis 11 mounted on two rear ground engaging wheels 12 and two ground engaging front wheels 14. Depending on the type of tractor, only the front wheels 14 are steerable but on some models both the front wheels 14 and rear wheels 12 can be steered. The chassis 11 typically provides a seat 16 for the user or operator and is provided with the necessary controls including a steering wheel 18.

Some of the riding mowers have the mower deck mounted on the front while others have the mower deck mounted between the rear wheels 12 and front wheels 14. In the drawings there is illustrated a mower deck 20 that is somewhat centrally mounted beneath the chassis 11 and between the rear wheels 12 and front wheels 14 of the tractor unit.

Also, at the present time, these riding mower units are provided with decks of different widths. Obviously, the wider the deck and thus the wider the cutting path, the quicker it is to mow large areas. However, the wider decks especially have difficulty mowing the bottom of narrow ditches, and of course are more expensive and require a larger trailer to move from place to place. Moreover, at the present time, there is no known mower available with a deck over 60 inches in width which can bag all of the grass. This is because some of the blades are too far from the bagger to adequately convey the grass to the bagger.

In the drawings, there is illustrated a mower deck 20 supported on small wheels 22 that allow the deck to be mounted on the chassis 10 and thereby float over the irregular contours of the ground being mowed. The illustrated mower unit contains three cutting blades 24 in the main deck 20, one centrally located and one on each side. As best seen in FIG. 1, the sides of the deck 20 as well as the outside cutting blades 24 extend beyond the width of the tractor unit so that grass can be cut close to obstacles. However, as is well known to those skilled in the art, all known designs of tractor style mowers have limitations on cutting around and under obstacles, along ditches and on steep hills.

The cutting blades 24 in the main deck 20 are rotatably driven in any suitable manner, usually by belts connected to drive shaft pulleys which are in turn connected in any suitable manner to the power source of the tractor unit. The drive of the blades is well known to those skilled in the art.

The auxiliary mowing deck 25 of the invention includes a suitable housing 26 that encloses a rotating cutting blade 28 which rotates about a vertical shaft turnable in suitable bearings or bushings (not shown) positioned in the housing 26. As is well known, the housing 26 is open at the bottom, and includes a discharge chute 32 directed forwardly and inwardly so that the grass cut by blade 28 and discharged from the chute 32 will lie in the path of the main deck 20. The housing 26 is formed from a suitable material, such as aluminum, by any suitable method. The specific manner of manufacturing housings of this type are well known to those skilled in the art.

As best seen in FIGS. 1, 2 and 3, the auxiliary mowing unit 25 of the invention is mounted on the left side of the main deck 20 with the cutting arc of the blade 28 extending forwardly of the most forward cutting arc of the blade 24. Also, the cutting arc of the blade 28 creates a cutting path that overlaps with the cutting path of the blades 24 so that no uncut grass will remain regardless of the direction in which the tractor unit 10 is driven.

The housing 26 is pivotly mounted to the left front of the main deck 20 by a first horizontal pivot pin 34 that is secured for pivotal movement in a cylindrical recess formed in a boss 36 on the main deck 20. Pivot pin 34 is also suitably secured to the housing 26 of the auxiliary mower unit 25.

In order to provide complete lateral stability, there is also provided a second pivotal connection between the auxiliary mowing unit 25 and the main deck 20. As best seen in FIGS. 3, 4 and 5, an upper rod 38 is secured at its inner end to a fixed pivot 40 on the upper portion of the main deck 20 while a lower rod 42 similarly has its inner end attached to a fixed pivot 44 on the lower end of the deck 20. The upper rod 28 and lower rod 42 converge toward each other with their outer ends fixed together as shown at 46. The joined outer ends 46 provide a pivotal connection to a pivot pin 48 secured to the top of the housing 26 of the auxiliary mower unit. If desired, this pivot connection between the outer ends 46 and the pivot pin 48 may be by a ball and socket type joint. In any event, the pivot point between the pivot pin 48 and the outer ends 46 of the rods 38 and 42 is aligned with the pivotal axis of the pivot pin 34. This thus allows the auxiliary mower unit 25 to pivot freely about a horizontal axis both upwardly and downwardly. The triangular pivot arrangement provided by the upper rod 34 and lower rod 42 provide not only support but lateral stability to the mounting of the auxiliary mowing unit 25.

Preferably, the fixed pivots 40 and 44 on the main deck 20 are designed so as to be quickly and easily removed. For example, the pivots 40 and 44 may be provided by pins extending through vertical cylindrical openings with the bottom pin secured in place by suitable fasteners such as clip pins, that can be easily and quickly removed when it is desired to remove the auxiliary mowing unit 25 from the main deck 20.

Also, to support the auxiliary mounting unit 25 in its travel over the ground to be mowed, an inner front wheel 50 is mounted on the forward end of the housing 26, as best seen in FIG. 1. In addition, an anti-scalping wheel 52 is secured toward the outer front edge of the housing 26, and a second anti-scalping wheel 53 is secured on the rear inner portion of the housing 26. Wheels 52 and 53 are of the swivel type and serve to prevent scalping of the ground when the unit 25 is moving over uneven ground.

Figure 7:
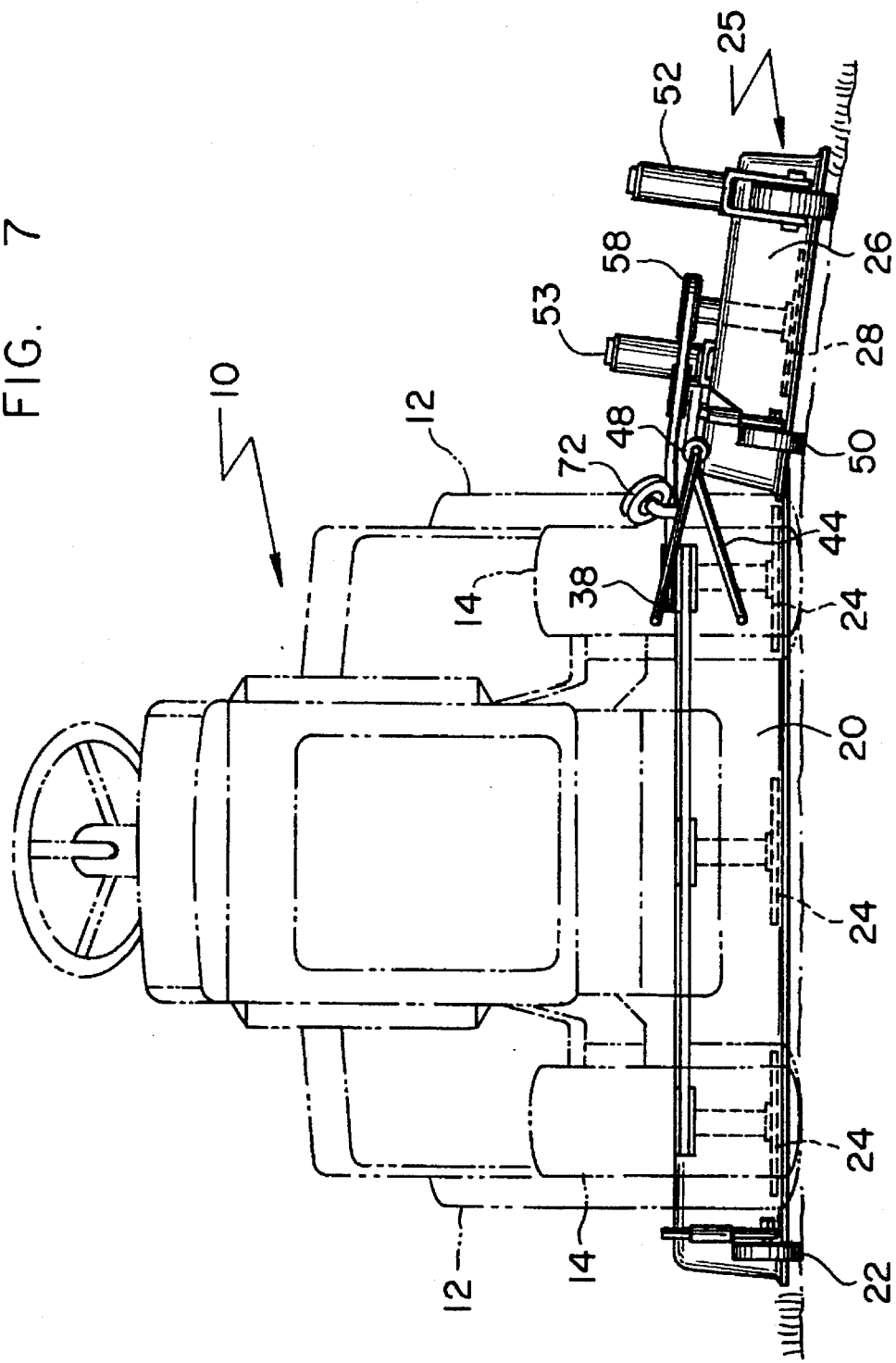
FIG. 7 is a front view illustrating the action of the auxiliary deck on a declining slope.
Figure 8:
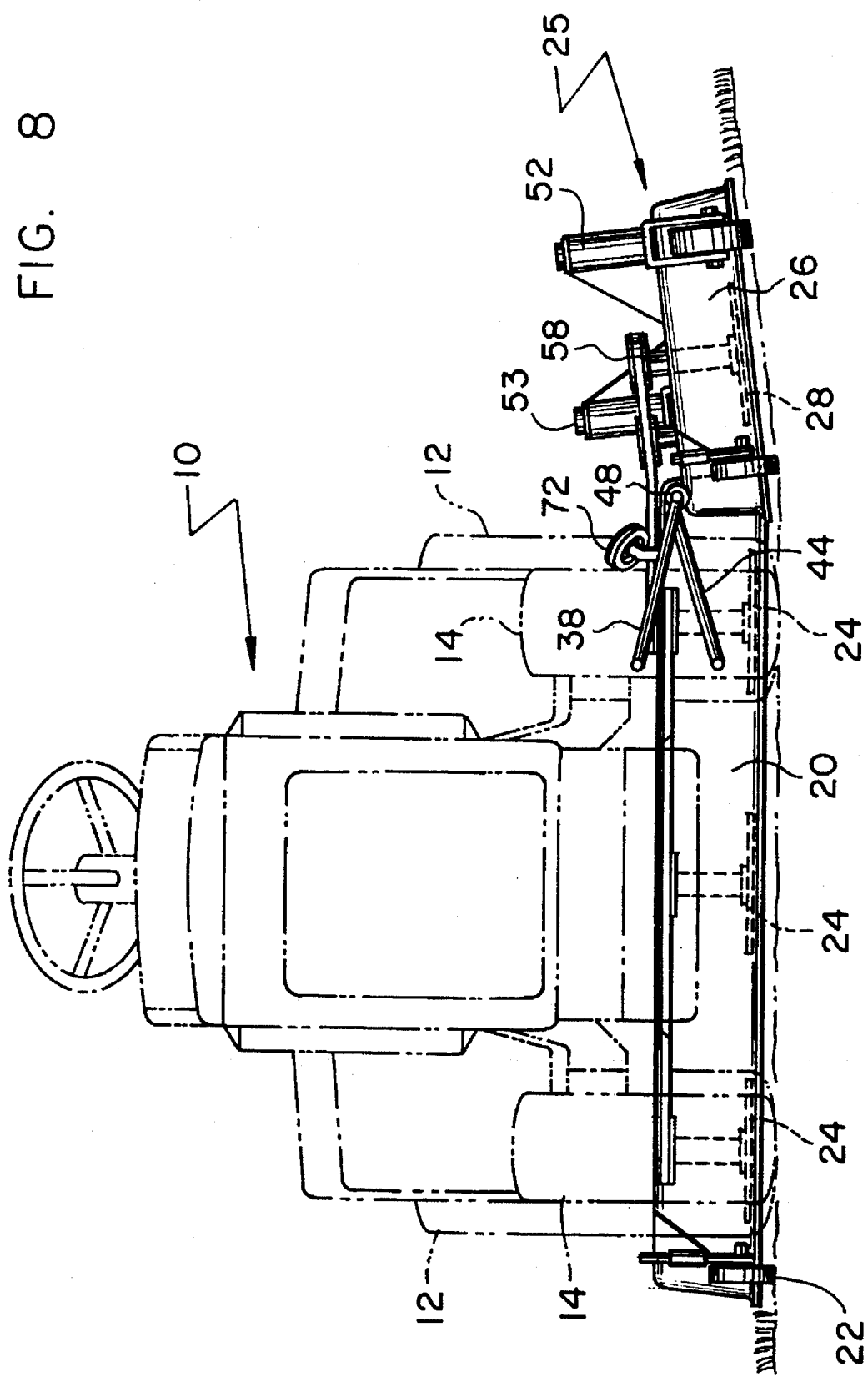
FIG. 8 is a front view similar to FIG. 7 but showing the action of the auxiliary deck on an incline.

With the foregoing arrangement, the auxiliary mowing unit 25 will travel easily along the ground, following the contour of the ground by pivoting upwardly and downwardly about the pivot pin 34 and the pivot pin 48. As illustrated in FIGS. 7 and 8, the auxiliary mowing unit will easily follow the contour of the ground whether it slopes downwardly or upwardly. This allows the unit to easily mow on level or uneven flat land and along sides of ditches, including ditches with narrow bottoms that could not be mowed with mowers having a mowing path of comparable width on in one fixed deck.

The cutting blade 28 of the auxiliary mowing unit 25 is powered in any suitable manner. The drawings illustrate a pulley and belt connection that allows the cutting blade 28 to be driven from the closest blade 24 in the main deck 20. By adding a drive pulley 54 to the shaft 56 of the left-most blade 24, and by connecting a pulley 58 to the shaft 30 of the cutting blade 28 and interconnecting pulleys 54 and 58 by belt 60, the cutting blade 28 will be driven at the same speed as the blades 24 of the main deck 20. To maintain the proper tension in the belt 60, a belt tensioning idler pulley 62 engages the belt 60, with the pulley 62 being mounted on an arm 64 mounted for swinging movement about a pin 66 in the top of housing 26. A suitable spring 68 biases the pulley 62 into engagement with the belt 60 at all times to maintain proper tension in the belt 60.

Since the auxiliary mowing unit 25 pivots about a horizontal axis relative to the main deck 20, there is also provided an idler pulley 70 mounted on the main deck 20 for rotation about a vertical axis and a second guide pulley 72 mounted on the main deck 20 for rotation about an axis that is at an angle to the horizontal. This guide pulley 72 will maintain the belt so that it runs in alignment with the pulleys 54 and 58 during the time that the auxiliary mowing unit 25 pivots relative to the main deck 20.

FIGS. 1 and 2 also illustrate a cable lift mechanism that can be used to lift the auxiliary mowing unit 25 at the same rate as the main deck 20. A cable 80 is attached to a lift arm 82 accessible to the operator of the mower. The cable 80 extends around a first horizontal pulley 84 and then around a second vertical pulley 86 after which the cable 80 is attached to the front portion of the main deck 20 near the side where the auxiliary mowing unit is mounted. The specific cable arrangement will vary depending upon the particular type of mower with which the attachment of the invention is used.

In operation, the operator of the tractor unit 10 will utilize the standard controls for starting and stopping the tractor and stopping and starting the mower blades 24 contained in the main deck 20. Because of the direct connection of the cutting blade 28 through the belt and pulley system to the drive for the cutting blades 24, the cutting blade 28 will be driven during all of the time that the blades 24 are driven. During flat land mowing, including uneven flat land, the operator merely mows in the normal manner, but because of the extra width of the cutting path provided by the auxiliary mowing unit 25, mowing time is reduced. For example, with a 50 inches wide normal cutting path of the tractor unit provided by the main deck 20, and with the auxiliary unit 25 providing approximately a 20 inches cutting path, the total cutting path will be approximately 68 inches because of the overlap between the cutting path of the main deck 20 and that of the auxiliary unit 25. Since a typical unit with a 50 inches main deck is normally provided with a means for bagging the clippings, discharge of the clippings from the auxiliary deck 25 through the discharge chute 32 into the cutting path of the main deck 20 will allow all of the clippings to be bagged.

Because of the unique pivotal mounting of the auxiliary mowing unit 25, a tractor mowing unit equipped with the auxiliary mowing unit 25 will do a far superior job than the typical tractor mowing unit with a single deck. This is especially true in areas where the contour of the land changes rather abruptly such as in ditches, areas where side hills join somewhat level land, etc. Use of the auxiliary mowing unit 25 is especially useful in narrow bottom ditches where known tractor mowing units simply cannot do the job because of severe scalping or the inability to cut the grass to the desired height.

Figure 6:
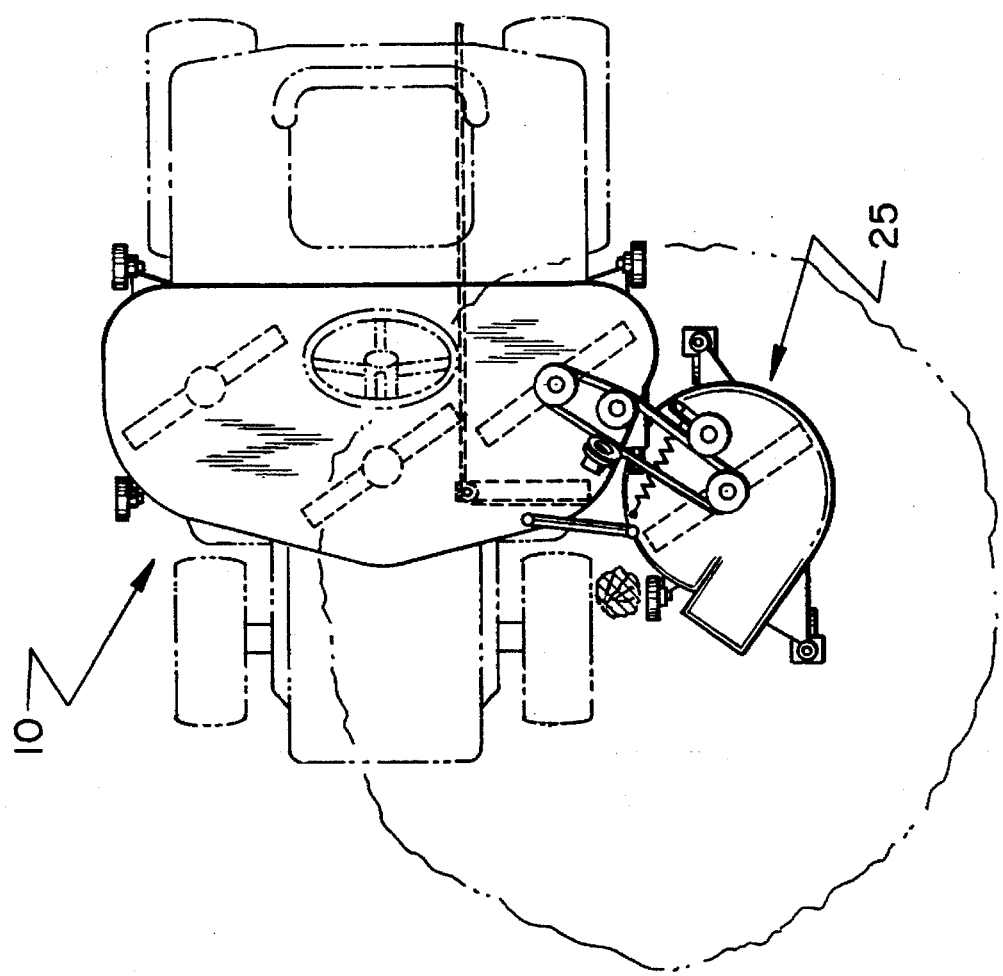
FIG. 6 is a top or plan view of a tractor unit with the auxiliary mower deck attached to illustrate the ability of cutting beneath and close to a small tree.

Also, as illustrated in FIG. 6, trimming around small trees can be accomplished without making a complete 360° turn. FIG. 6 shows cutting around the small tree by first approaching the tree with the auxiliary mowing unit 25 cutting the grass to the left of the tree and the main deck 20 mowing up to the near side of the tree. The operator then backs the tractor unit up, cuts the grass to the right of the tree and around the front of the tree using the square corner capability of the auxiliary unit 25 to complete mowing of the grass around the entire tree. This would also be true in mowing around any vertical obstruction of a narrow diameter such as support poles, clothesline poles, etc.

If small trees with low outwardly extending branches are encountered, the addition of the auxiliary cutting unit 25 provides an additional extension to allow cutting both closer to and around the branch of the tree. This is illustrated in FIG. 6 in which a small tree is shown from a plan view with the auxiliary cutting unit 25 close to and behind the trunk of the tree.

With the auxiliary mowing unit 25, grass can be cut very close to an obstruction forming an inside corner in one continuous operation by merely positioning the housing 26 of the auxiliary unit 25 close to and moving it along the obstruction. Without the addition of the auxiliary mowing unit 25 of the invention, the tractor mowing unit of the type having a center deck has a difficult time mowing around inside corners because the front of the tractor unit is in the way. Even with a tractor unit having front-mounted cutting deck, the front guide wheels for the deck also make it difficult.

Figure 9:
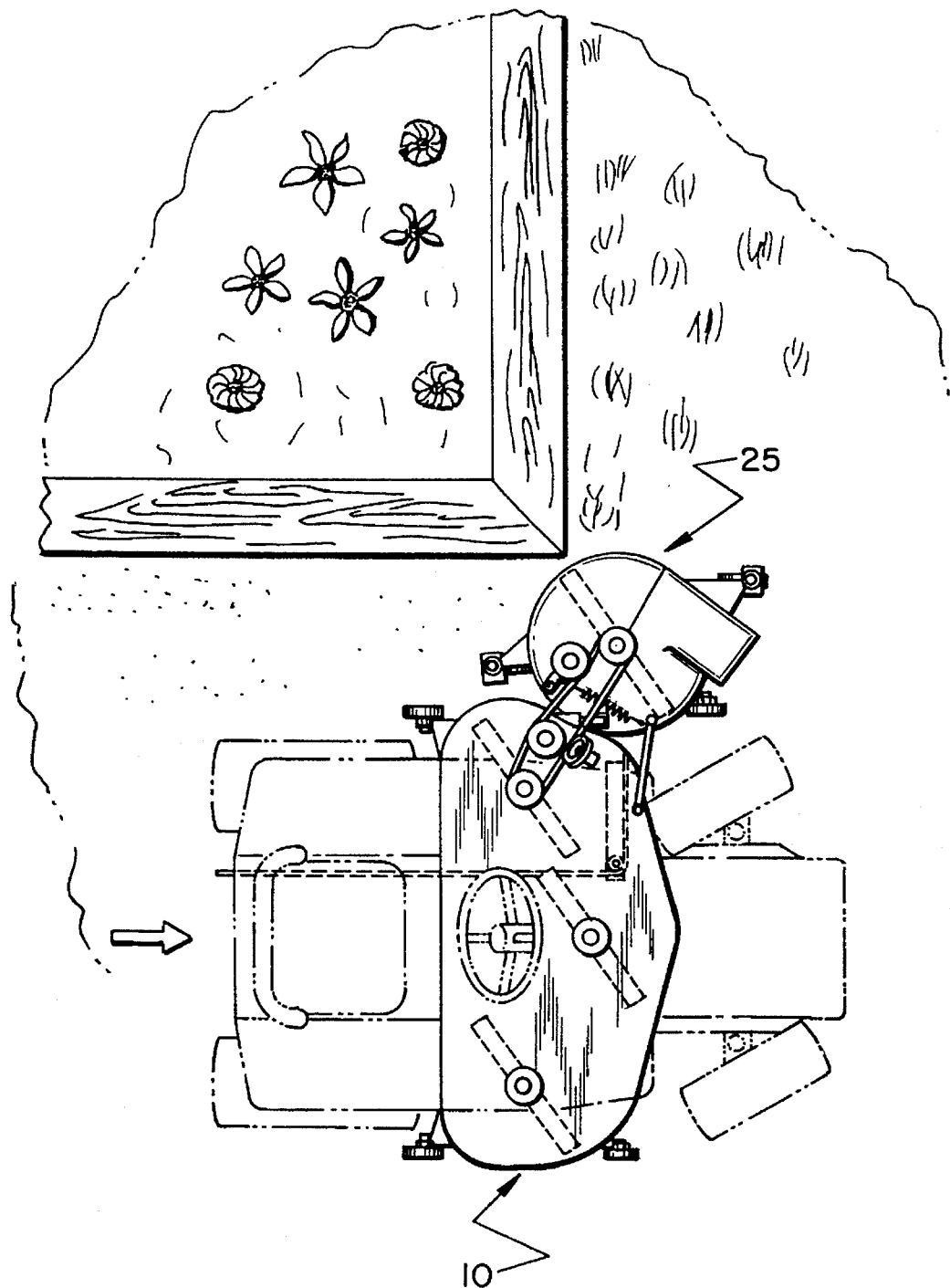
FIG. 9 is a top or plan view illustrating the ability of the auxiliary deck to cut around an outside corner.
Figure 10:
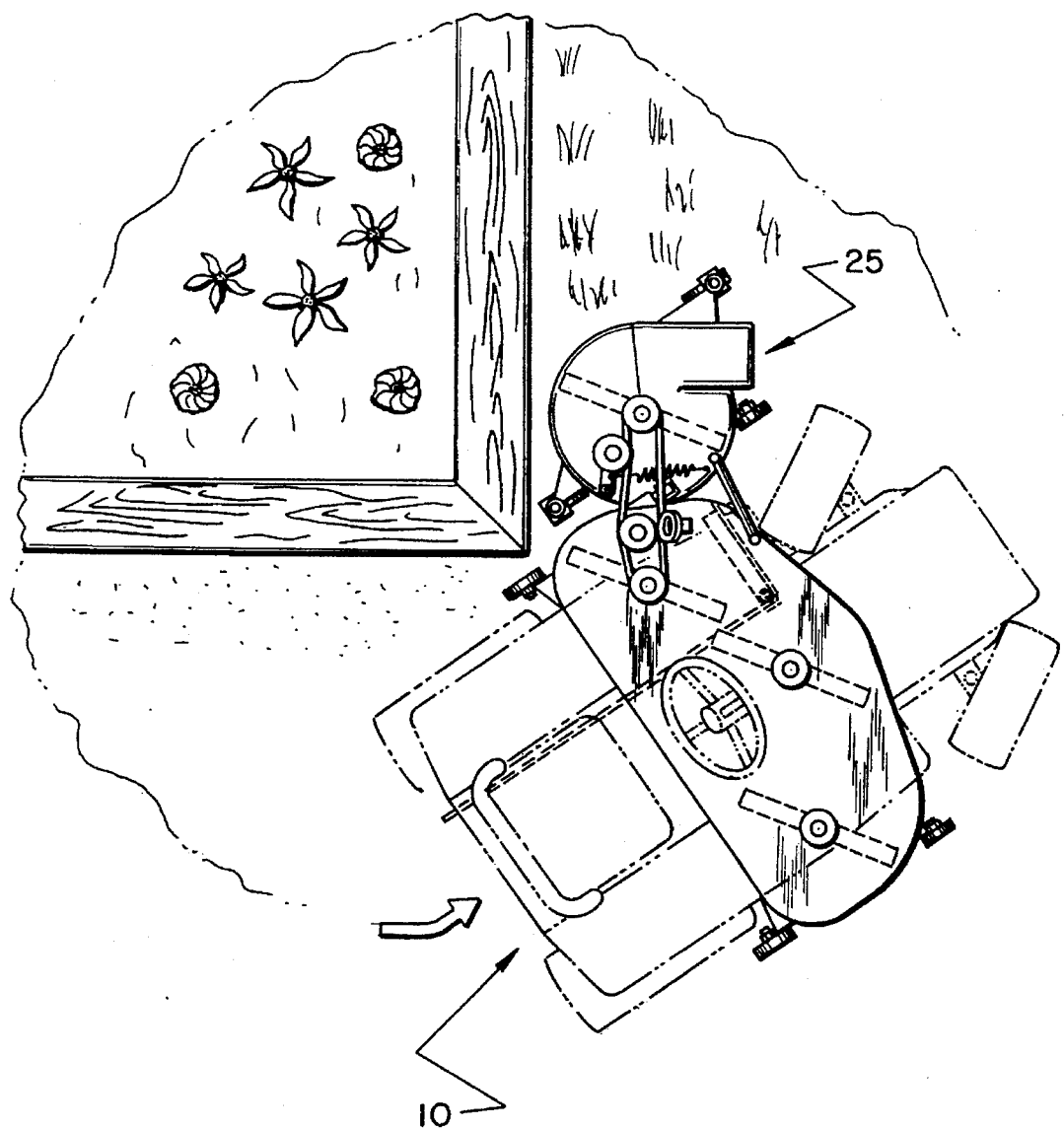
FIG. 10 is a top view similar to FIG. 9 and illustrating the completion of the mower around an outside corner.

FIGS. 9 and 10 illustrate the usefulness of the auxiliary mowing unit 25 when cutting around an outside corner. Without the auxiliary mowing unit 25, and using a tractor unit of the type illustrated in the drawings, the operator has to stop, back up and then go forward in order to mow around the outside corner. Even with the front mounted deck, mowing around the outside corner of an obstruction is a slower process.

The tractor mowing unit provided with the auxiliary mowing unit 25 of the invention also can mow between small objects as close as 25 inches by doing a square corner and then backing up. With the known tractor mowing units, mowing between such small objects cannot be done and trimming must be done by hand. This is especially useful, for example, in cemeteries in which there are closely spaced grave markers. In such an application, the known riding mower units are not very useful because of all the hand trimming that must be done.

A tractor mowing unit provided with the auxiliary mowing unit 25 of the invention has many of the advantages of the front mount type mowing units but none of the disadvantages. The addition of the auxiliary mowing unit of the invention provides a riding mower that has a zero turning radius, and because of its ability to mow between closely spaced objects, can do almost anything that a hand push mower can. This is all accomplished without the loss of steep hillside capability, a tractor unit provided with the auxiliary mowing unit 25 of the invention being very stable on hillsides.

With the unique support arm and pivot arrangement of the invention, the auxiliary mowing unit 25 can be attached and removed very quickly without any special tools. All that is necessary is to remove any clip pins holding the pivot pins, remove the drive belt and lift the mower. Assembly is equally easy by aligning the pivot pins, and dropping them into their pivot seats and reattaching the drive belt.

As previously indicated, other modifications can be made to the preferred embodiment while still utilizing the principles of the invention. For example, if the tractor mowing unit has a hydraulic system as do some of the larger units, the cutting blade of the auxiliary mower unit can be driven by a hydraulic motor. This would require merely that the hydraulic motor be connected by appropriate quick disconnect connectors and hoses into the hydraulic system of the tractor unit. Such connections are within the knowledge of those skilled in the art.

Although the addition of the auxiliary mowing unit of the invention provides an expanded cutting width along with the capabilities of cutting around objects as described herein, the pivot mounting of the auxiliary mowing unit allows the unit to be raised for transport so that it can be hauled in the same trailer as the tractor unit to which it is attached. Although I have not described the specific manner in which the unit could be lifted and locked in place for transport, this can be manually done or can be done in any suitable manner within the skill of persons in the art.

Having thus described the invention in connection with the preferred embodiment thereof, it will be obvious that various revisions and modifications can be made to the preferred embodiments without departing from the spirit and scope of the invention. It is my intention, however, that all such revisions and modifications that are obvious to those skilled in the art will be included within the scope of the following claims.

What is claimed is as follows:

1. An attachment for riding mowers and the like having front and rear ground engaging wheels with a main cutting deck mounted between the front and rear wheels with the sides of the deck extending outwardly beyond the wheels, the main cutting deck having a discharge chute and at least one power driven cutting blade that cuts a path along a cutting plane and discharges the cuttings as the mower moves forwardly and rearwardly, said attachment comprising: an auxiliary cutting deck housing having a forward portion, a rear portion and outside and inside portions between the forward and rear portions; a cutting blade mounted for rotation inside the auxiliary cutting deck housing for cutting a path; a first pivot mounting on the inside portion near the front portion of the auxiliary cutting deck housing for securing the auxiliary cutting deck housing to the side of the main cutting deck opposite the discharge chute of the mower and near the front of the main cutting deck; a second pivot mounting on the inside portion near the rear portion of the auxiliary cutting deck housing for securing the auxiliary cutting deck housing to said side of the main cutting deck; the first and second pivot mountings securing the auxiliary cutting deck housing to the main cutting deck in a position where the path of the main cutting deck and the path of the auxiliary cutting deck housing always overlap; the first and second pivot mountings providing for pivotal upward and downward movement of the auxiliary cutting deck housing relative to the main cutting deck about a substantially horizontal axis to provide for free and continuous floating movement of the auxiliary cutting deck housing upwardly and downwardly relative to the cutting plane of the main cutting deck; a first support wheel secured to the auxiliary cutting deck housing on the front portion of the auxiliary cutting deck housing near the outside portion; and means for connecting the cutting blade of the auxiliary cutting deck housing to the drive system of the mower so as to rotatably drive the cutting blade of the auxiliary cutting deck housing.

2. The attachment of claim 1 in which there is a second support wheel secured to the auxiliary cutting deck housing on the front portion of the housing near the inner portion.

3. The attachment of claim 2 in which the first support wheel is mounted so as to be turnable about a vertical axis through 360°.

4. The attachment of claim 1 in which the housing of the auxiliary cutting deck housing is provided with a discharge chute, the discharge chute being located on the front portion of the auxiliary cutting deck housing so as to direct and discharge cuttings from the auxiliary cutting deck housing into the cutting path of the main cutting deck.

5. The attachment of claim 1 in which the substantially horizontal axis of the first and second pivot mountings is in a plane above the plane of rotation of the cutting blade of the auxiliary cutting deck housing.

6. The attachment of claim 1 in which the first pivotal mounting includes an upper and a lower pivot connected to the main deck, a pivot connected to the auxiliary cutting deck housing, an upper arm extending outwardly from the upper pivot and connected to the pivot on the auxiliary cutting deck housing and a lower arm extending outwardly from the lower pivot and connected to the pivot on the auxiliary cutting deck housing.

7. The attachment of claim 1 in which the first and second pivot mountings of the auxiliary cutting deck housing to the main deck are along a line that lies in a vertical plane passing through approximately the center of the overlap of the cutting paths of the main deck and the auxiliary cutting deck housing.

8. The attachment of claim 1 in which the means for connecting the cutting blade of the auxiliary cutting deck housing to the drive system of the mower includes a first pulley operatively connected to the cutting blade of the auxiliary cutting deck housing and a second pulley operatively connected to the cutting blade of the main deck, and a drive belt interconnects the first and second pulleys.

9. The attachment of claim 1 in which the first and second pivot mountings are provided with connecting means that are quickly connected and disconnected.

* * * * *